(12) United States Patent
Haveaux et al.

(10) Patent No.: US 6,881,493 B2
(45) Date of Patent: Apr. 19, 2005

(54) POLYOLEFINS AND USES THEREOF (75) Inventors: Bernard Haveaux, Petit-Roeulx (BE); Thierry Coupin, Carnières (BE)

(73) Assignee: ATOFINA Research S.A., Feluy (BE)

( * ) Notice: Subject to any disclaimer, the term of this patent is extended or adjusted under 35 U.S.C. 154(b) by 0 days.

(21) Appl. No.: 09/973,207

(22) Filed: Oct. 9, 2001

(65) Prior Publication Data

US 2002/0055561 A1 May 9, 2002

Related U.S. Application Data (62) Division of application No. 09/233,829, filed on Jan. 20, 1999, now Pat. No. 6,348,272.

(30) Foreign Application Priority Data

Jan. 21, 1998 (EP) .............................. 98100982

(51) Int. Cl.[7] .............................................. B32B 27/32
(52) U.S. Cl. .................... 428/523; 428/304.4; 428/515; 428/516; 525/240; 526/351
(58) Field of Search .............................. 428/304.4, 523, 428/516, 515; 525/240; 526/351

(56) References Cited

U.S. PATENT DOCUMENTS 5,691,043 A * 11/1997 Keller et al. ................. 428/212
6,348,272 B1 * 2/2002 Haveaux et al. ............. 428/516

FOREIGN PATENT DOCUMENTS

| EP | 0628577 | 12/1994 |
| EP | 0747430 | 12/1996 |
| EP | 0818475 | 1/1998 |
| WO | 9012816 | 11/1990 |
| WO | 9744389 | 11/1997 |

* cited by examiner

*Primary Examiner*—D Lawrence Tarazano
(74) *Attorney, Agent, or Firm*—Grady K. Bergen

(57) ABSTRACT

Uses of syndiotactic/atactic block polypropylene are provided in which the molecular weight thereof is preferably at least 120kD. The syndiotactic/atactic block polypropylene may be used as a polypropylene modifier, a component in an adhesive composition, a shock absorber component, a waterproof membrane component, a packaging film or component thereof, a shapable composition component, and an acoustic absorbent material component, a composition for moulding into a footwear component, a bitumen modifier, a compatibiliser, an emulgator or an emulsifier, as a viscosity improver, and as a spilled oil absorber.

26 Claims, 6 Drawing Sheets

POLYOLEFINS AND USES THEREOF

This application is a division of U.S. patent application Ser. No. 09/233,829, filed Jan. 20, 1999, and entitled Polyolefins and Uses Thereof, now U.S. Pat. No. 6,348,272.

FIELD OF THE INVENTION

The present invention relates to polyolefins, especially polypropylenes and their uses.

DESCRIPTION OF THE PRIOR ART

As known in the art, syndiotactic polymers have a unique stereochemical structure in which monomeric units having enantiomorphic configuration of the asymmetrical carbon atoms follow each other alternately and regularly in the macromolecular main chain. Syndiotactic polypropylene was first disclosed by Natta et al. in U.S. Pat. No. 3,258,455. The Natta group obtained syndiotactic polypropylene by using a catalyst prepared from titanium trichloride and diethyl aluminum monochloride. A later patent to Natta et al., U.S. Pat. No. 3,305,538, discloses the use of vanadium triacetylacetonate or halogenated vanadium compounds in combination with organic aluminum compounds for producing syndiotactic polypropylene.

U.S. Pat. No. 3,364,190 to Emrick discloses a catalyst system composed of finely divided titanium or vanadium trichloride, aluminum chloride, a trialkyl aluminum and a phosphorus-containing Lewis base as producing syndiotactic polypropylene. U.S. Pat. No. 4,892,851 disclosed a metallocene catalyst for producing highly crystalline syndiotactic polyolefins.

As disclosed in these patent references and as known in the art, the structure and properties of syndiotactic polypropylene differ significantly from those of isotactic polypropylene. The isotactic structure is typically described as having the methyl groups attached to the tertiary carbon atoms of successive monomeric units on the same side of a hypothetical plane through the main chain of the polymer, e.g., the methyl groups are all above or below the plane. Using the Fischer projection formula, the stereochemical sequence of isotactic polypropylene is described as follows:

Another way of describing the structure is through the use of NMR. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is designated as:

In NMR nomenclature, this pentad is described as . . . rrrr . . . in which each "r" represents a "racemic" dyad, in., successive methyl groups on alternate sides of the plane.

The percentage of r dyads in the chain determines the degree of syndiotacticity of the polymer. Syndiotactic polymers are crystalline and, like the isotactic polymers, are insoluble in xylene.

This crystallinity distinguishes both syndiotactic and isotactic polymers from an atactic polymer that is soluble in xylene. Atactic polymer exhibits no regular order of repeating unit configurations in the polymer chain and forms essentially a waxy product. While it is possible for a catalyst to produce all three types of polymer, it is desirable for a catalyst to produce predominantly syndiotactic or isotactic polymer with some atactic block fractions.

PCT/EP97/03649 (filed on 10th July 1997) of the present applicants describes a new syndiotactic/atactic block homopolyolefin and particularly a new syndiotactic/atactic block homopolypropylene. PCT/EP97/03649 also describes a catalyst and process for preparing syndiotactic/atactic block polyolefins, and more particularly syndiotactic/atactic block polypropylene. The catalyst and process can each be adapted to produce a polymer with differing syndio-/atactic block ratios.

SUMMARY OF THE INVENTION

The present invention provides use of syndiotactic/atactic block polypropylene whereby the properties thereof, especially the mechanical properties, are exploited. The syndiotactic/atactic block polypropylene has a combination of plastic properties conferred by the syndiotactic block and elastomeric properties conferred by the atactic block and may be regarded as a member of the "thermoplastic elastomer" family of polymers.

In one aspect, the present invention provides use of syndiotactic/atactic block polypropylene as a modifier of a polyolefin, such as isotactic and/or copolymeric polypropylene and/or other polyolefins. The modified polyolefin or polypropylene formed thereby may be capable of moulding, for example by extrusion, injection or compression and can be used, for example, in high impact resistance applications such as automobile parts, electronic appliances, packaging and sports goods. Accordingly, there is further provided a high impact resistance polyolefin such as a polypropylene, comprising a dispersion of syndiotactic/atactic block polypropylene in a continuous phase comprising isotactic and/or copolymeric polypropylene. Preferably, the amount of syndiotactic/atactic block polypropylene is in the range 3 to 50% preferably 5 to 15% by weight of the polypropylene. It is thought that the syndiotactic/atactic block polypropylene forms discrete dispersed particles in the continuous phase. In this way, the syndiotactic/atactic block polypropylene functions in the same way as rubber or elastomers in high impact polystyrene or as EPDM (ethylene propylene diene monomer such as a 1,4-hexadiene, or dicyclopentadiene or 5-ethylidene norbornene) particles in polypropylene.

In a further aspect, the present invention provides use of syndiotactic/atactic block polypropylene as a component in an adhesive composition. There is further provided an adhesive composition comprising a syndiotactic/atactic block polypropylene and at least one component selected from a wax, and a tackifying and/or reinforcing resin such as HERCOTAC 205 or MBG 212 (both from Hercules). Such adhesive compositions may be used, for example, in book binding applications. In such applications it is preferred that the components of the adhesive are selected so as to give a storage modulus G' in the range $3\times10^6$ to $5\times10^7$ and a soft phase glass transition temperature in the range 5 to 30° C.

In a further aspect the present invention provides use of a syndiotactic/atactic block polypropylene as a component in a shock absorber. There is further provided a shock absorber comprising syndiotactic/atactic block polypropylene. In this application, the syndiotactic/atactic block polypropylene exhibits elasticity without rebound. It is found that rebound decreases as the molecular weight of the polypropylene increases. The syndiotactic/atactic block polypropylene appears to act in an analogous way to butyl rubber and could therefore be used in its place, wherever mechanical properties are concerned. The chemical properties of syndiotactic/atactic block polypropylene differ from those of butyl rubber. In particular, syndiotactic/atactic block polypropylene requires no further vulcanization during processing.

The shock absorber may further comprise other components known by those skilled in this art for use therein, such as carbon black, oils, inorganic fillers, organic fillers, other polymers and foaming and processing agents. Typical applications of such shock absorbers include footwear soles, silent-block (noise absorber or damper) and any absorber or damper required between vibrating parts.

Preferably, the shock absorber is for use at room temperature, for example 20° C., and above.

In a further aspect, the present invention provides use of a syndiotactic/atactic block polypropylene as a component in a waterproof membrane. There is further provided a waterproof membrane comprising a sheet of syndiotactic/atactic block polypropylene modified with carbon black and/or a UV absorber and/or an antioxidant, and/or a weather resistance improver. Preferably, the amount of carbon black in the waterproof membrane is in the range 0.5% to 50%, more preferably 3% to 30%, depending on the grade of carbon black. It is found that carbon black dramatically improves the weathering resistance of the membrane. It is possible to extrude a very large sheet of the syndiotactic/atactic block polypropylene. In this way, the use of syndiotactic/atactic block polypropylene is similar to that of EPDM. Such sheets are useful in roofing applications.

In a further aspect, the present invention provides use of a syndiotactic/atactic block polypropylene in the form of a packaging film or as a component thereof. There is further provided a packaging material comprising a blown film of polypropylene comprising a syndiotactic/atactic block polypropylene. The polypropylene may comprise a blend of the syndiotactic/atactic block polypropylene. In one embodiment, the blown film is shrinkable. Good bubble stability is achievable in the production of blown films, particularly with a high molecular weight such as one above 180 kD. Shrinkable blown films are useful in bottle packaging, palette packaging and "thrown-away" packaging (i.e. packaging for additives used in formulations in which the additives are added to the formulation together with the packaging itself so that the packaging forms part of the formulation).

In a further aspect, the present invention provides a drawn fibre, film or thread of syndiotactic/atactic block polypropylene. The fibre, film or thread may therefore comprise other polymers, usually blended with the syndiotactic/atactic block polypropylene, preferably a polyolefin such as isotactic polypropylene, copolymeric polypropylene, high density polyethylene and/or low density polyethylene.

In a further aspect, the present invention provides use of a syndiotactic/atactic block polypropylene as a continuous phase component in a shapable composition. There is further provided a shapable composition comprising a continuous phase of syndiotactic/atactic block polypropylene in which is dispersed isotactic polypropylene, copolymeric polypropylene or another polymer such as a polyolefin. Preferably, the shapable composition softens upon heating and becomes rigid upon subsequent cooling. The shapable composition is typically soft and may be gently warmed for shaping, for example by hand. The syndiotactic/atactic block polypropylene has a glass transition temperature close to 0° C. When subsequently cooled, the composition becomes rigid owing to the presence of the isotactic polypropylene. The rigidity is due to crystallisation, whose speed is controlled by the amount of isotactic polypropylene, which is typically in the range 5 to 30% by weight of the composition. The shapable composition may be used in the production of a plaster cast or by craftsmen or artists. In a further aspect, the present invention provides use of syndiotactic/atactic block polypropylene as a component in an acoustic absorbent material. There is further provided an acoustic absorbent material comprising a blend, laminate or coextrudate of syndiotactic/atactic block polypropylene with at least one of isotactic, syndiotactic or copolymeric polypropylene or another polymer such as a polyolefin. Each constituent of the acoustic absorbent material will absorb a part of the acoustic spectrum. The material may be useful in automobile interiors, for example.

In a further aspect the present invention provides a foam comprising syndiotactic/atactic block polypropylene.

The foam may be extruded, injection moulded or compressed. Long chain branching of the Syndiotactic/atactic block polypropylene affords a high melt strength which is required in the foam form, especially for a soft foam. The syndiotactic/atactic block polypropylene is preferably crosslinked, typically by addition of peroxide during foaming, or by curing with electron beam. Alternatively, the Syndiotactic/atactic block polypropylene may be blended with another compatible polymer such as a polyolefin so as to afford greater rigidity, depending on the respective amounts of the ingredients. Typically, the compatible polymer is present in an amount of from 0 to 99% preferably 5 to 30%. Such foams may be used, for example, as thermal or acoustic insulating material or as shock absorbers.

In a further aspect, the present invention provides use of syndiotactic/atactic block polypropylene in a composition for moulding into a footwear component, usually in the sole. The invention further provides a composition for moulding into a footwear component, which comprises a syndiotactic/atactic block polypropylene optionally in combination with one or more additives known for this purpose, including plasticizer, polymeric fillers, mineral fillers and protective agents. Among these additives may be selected general purpose polystyrene, high impact polystyrene and/or appropriate oils. An appropriate choice of amount of syndiotactic/atactic block polypropylene and/or the selection of other components allows adjustment of the surface finish of the footwear component. In this way a matt or gloss finish may be achieved according to end use.

In a further aspect, the present invention provides a composition comprising a syndiotactic/atactic block polypropylene and a mineral filler, such as talcum, carbonate, silica and/or ash. Such mineral fillers may be used to improve the properties, such as weathering resistance, or reduce the price of the syndiotactic/atactic block polypropylene. Articles which may be made from such compositions include outdoor furniture, toys and sporting goods.

In a further aspect, the present invention provides use of syndiotactic/atactic block polypropylene as a compatibilizer, an emulgator or an emulsifier. Such use is particularly advantageous in plastics recycling or upgrading. The syndiotactic/atactic block polypropylene may be blended or mixed with plastics to obtain a mono-or biphasic system in which the syndiotactic/atactic block polypropylene may induce or create a continuous or dispersed phase depending on the processing conditions and the chemical and physical characteristics of the plastics.

In a further aspect, the present invention provides a coextrudate of syndiotactic/atactic block polypropylene with polypropylene and another polyolefin such as another polypropylene, a polypropylene copolymer, low density polyethylene, high density polypropylene or linear low density polyethylene. This is another example of the use of the Syndiotactic/atactic block polypropylene as a compatibilizer. For example, the syndiotactic/atactic block polypropylene may comprise an intermediate layer between a layer of a first polyolefin and a layer of a second polyolefin, which layers may be incompatible with one another in the absence of the intermediate layer. For example, the first polyolefin may comprise syndiotactic polypropylene and the second polyolefin may comprise isotactic polypropylene.

The Syndiotactic/atactic block polypropylene may be present as a layer in a laminate between a layer of the polypropylene and the layer of the polyolefin.

In this embodiment, the syndiotactic polypropylene imparts dielectric properties, higher gloss and improved impact resistance whereas isotactic polypropylene imparts a higher crystallinity which gives the co-extrudate rigidity.

In a further aspect, the present invention provides use of syndiotactic/atactic block polypropylene as a viscosity improver, especially in a motor oil. There is further provided a motor oil which includes syndiotactic/atactic block polypropylene, typically in an amount of from 1 to 10 by weight of the material. Typically the viscosity index (VI) of the motor oil is in the range 100 to 150 (where VI=viscosity at 100° F./viscosity at 210° F.).

In a further aspect, the present invention provides use of cross-linked syndiotactic/atactic block polypropylene as a spilled oil absorber. In one embodiment there is provided a thermoplastic elastomer gel comprising cross-linked syndiotactic/atactic block polypropylene. There is further provided a spilled oil absorber comprising the thermoplastic elastomeric gel. A thermoplastic elastomeric gel has both hydrophobic and oleophilic properties. Syndiotactic/atactic block polypropylene is more soluble in solvent than either syndiotactic or isotactic polypropylene.

In a further aspect, the present invention provides a bitumen composition comprising a blend of bitumen with a syndiotactic/atactic block polypropylene, preferably wherein the amount of syndiotactic/atactic block polypropylene is less than 35% by weight of the composition, generally in the range 15 to 30% by weight.

The bitumen composition may be used in a waterproof membrane, a bridge membrane or in joints, for example, for buildings.

In a further aspect, the present invention provides use of syndiotactic/atactic block polypropylene in a composition or article substantially stable to gamma irradiation. There is further provided a composition or article substantially stable to gamma irradiation, which comprises syndiotactic/atactic block polypropylene optionally blended or co-extruded with a polyolef in such as polyethylene. Such compositions or articles include articles for sterilisation and medical articles such as blood pouches.

The catalyst useful in the production of the syndiotactic/atactic block polypropylene comprises a metallocene, i.e., a metal derivative of a cyclopentadiene, and an ionizing agent. The metallocene compound contains only one substituted cyclopentadienyl ring and is of the general formula:

$$R'' (C_4R'_m C_5 C_4 R'_n) XMeQ$$

wherein X is an hetero-atom ligand with one or two lone pair electrons and selected from the elements of Group VA or VIA and is preferably nitrogen, phosphorus, oxygen or sulfur, which can be substituted or non-substituted; $(C_4R_m'C_5C_4R_n')$ is a fluorenyl or a symmetrically substituted fluorenyl or cyclopentadienyl ring; R' is hydrogen or hydrocarbyl radical having from 1–20 carbon atoms, a halogen, an alkoxy, and alkoxy alkyl or an alkylamino or alkylsilylo radical, each R' may be the same or different and m and n independently are 0, 1, 2, 3 or 4, with the proviso that the bilateraly symmetry is maintained; R'' is a structural bridge between the X and $(C_4R'_m C_5 C_4 R'_n)$ ring to impart stereorigidity and, preferably is a silyl or a hydrocarbyl biradical having at least one silicon or carbon atom to form the bridge; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; Me can be in any of its theoretically possible oxidation states. Preferred metals for the catalyst of the invention are Zr, Ti, Hf.

The term "symmetrically" shall mean that the local bilateral symmetry of the active polymerization sites is essentially maintained.

The process for producing syndiotactic/atactic block polyolefins, particularly syndiotactic/atactic polypropylene comprises utilizing at least one of the catalysts described by the above formula and introducing the catalyst into a polymerization reaction zone containing an olefin monomer. In addition, a cocatalyst such as alumoxane may be introduced into the reaction zone. Further, the catalyst may also be pre-polymerized prior to introducing it into the reaction zone and/or prior to the stabilization of reaction conditions in the reactor.

Metallocene catalysts are single site catalyst which, generally, produce polymer having narrow molecular weight distribution.

While the process is mainly directed to a-olefin homopolymerization, copolymerization with other olefins can be obtained.

The polypropylene may comprise alternating blocks of syndiotactic and atactic sequences, preferably long syndiotactic and short atactic sequences, most preferably comprising a fraction of syndiotactic triads (rr) of at least 70%. The polypropylene preferably has a molecular weight of at least 120 kD, more preferably at least 180 kD.

BRIEF DESCRIPTION OF THE DRAWINGS

A more complete appreciation of the invention and many of the attendant advantages thereof will be readily understood by reference to the following detailed description when considered in connection with the accompanying drawings wherein.

DETAILED DESCRIPTION OF THE INVENTION

The syndiotactic/atactic block polypropylene comprises alternating blocks of syndiotactic and atactic sequences. The polymer possesses particularly long sequences of syndiotactic species and short sequences of atactic species. The syndio-/atactic ratio can easily be modified by changing the polymerization conditions and/or the catalyst structure within the invention. For example, as shown below, increasing the polymerization temperature for a given catalyst decreases the syndio-/atactic ratio. As also evidenced below, replacing a dimethylsilyl bridge by a diphenylsilyl bridge also decreases the syndio-/atactic ratio for identical polymerization conditions.

The Syndiotactic/atactic block polypropylene has elastomeric properties. Without being bound by the theory, it may be considered that these properties are deriving from the combination of the crystalline syndiotactic part and the amorphous atactic part.

The polymer obtained may have a molecular weight ranging from 100,000 to 1,000,000 depending on the polymerization conditions and on the catalyst used in the process. For example, as shown below, replacing a dimethylsilyl bridge by a diphenylsilyl bridge results in increased molecular weight under identical polymerization conditions.

It has been unexpectedly found that the present catalyst can be used for the production of high molecular weight polyalphaolefin with stereoregular/stereoirregular block micro-structure.

When propylene or other alpha-olefins are polymerized using a catalyst consisting of a transition metal compound, the polymer product typically comprises a random mixture (reactor blend) of amorphous atactic and crystalline xylene insoluble fractions. The crystalline fraction may contain either isotactic or syndiotactic polymer or a mixture of both. The present catalysts have syndio-/atactic specificity and produce polymeric chains with differing syndio-/atactic block ratios.

The metallocene catalysts of may be described by the formula

R" $(C_4R'_m C_5 C_4R'_n)$ MeXQ wherein X is an hetero atom ligand with one or two lone pair electrons and selected from the elements of Group VA or VIA and is preferably nitrogen, phosphorus, oxygen or sulfur which can be substituted or not.

$(C_4R'_m C_5 C_4R'_n)$ is a flucrenyl ring, preferably substituted symmetrically; each R' is hydrogen or hydrocarbyl radical having from 1–20 carbon atoms, a halogen, an alkoxy, and alkoxy alkyl or an alkylamino or alkylsilylo radical, each R' may be the same or different, m and n independently are 0, 1, 2, 3 or 4, and with the proviso that the bilateral symmetry is maintained; R' is a structural bridge between the hetero atom X and $(C_4R'_m C_5 C_4R'_n)$ ring to impart stereorigidity, and preferably is a silyl or hydrocarbyl biradical having at least one silicon or carbon atom to form the bridge; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; the transion metal can adopt any of the possible oxidation states. Preferred metals for the catalysts of the invention are Ti, Zr, Hf. A particularly suitable metal is Ti. $(C_4R'_4 C_5 C4R'_4)$ comprises hydrocarbyl biradicals bonded to two adjacent carbon atoms in a cyclopentadienyl ring to form a fused ring.

In order to obtain syndiospecificity the cyclopentadienyl or fluorenyl rings in the metallocene catalysts must be substituted in an essentially symmetric manner with respect to the active coordination positions so that the metallocene exibits bilateral symmetry at least around the active coordination site. It has been unexpectedly noted that if in the original syndiospecific catalysts described in U.S. Pat. No. 4,892,851 the non-substituted cyclopentadienyl is replaced by a heteroatom ligand with one or two lone pair electrons and selected from elements of Group V A or VI A, the stereospecificty of catalyst will be periodically changed from syndiospecificity to aspecificity during the polymerization giving rise to the formation of atactic blocks within the predominantly syndiotactic chain.

Bilateral symmetry is defined as the condition in which there is no substituents or one or more substituents on one side and no substituents or one or more substituents on the other side in the same relative position such that a mirror image is formed from one side to another. One preferred example of such a compound is 2,7 di-tert-butyl-9-fluorenyl dimethyl silyl, tert-butyl amido titanium dichloride.

Whilst not wishing to be bound by a theory and without intending to limit the scope of the present invention as indicated by the claims, it is believed that during the polymerization reaction the growing polymer chain migrates from one coordination position to the other after each monomer insertion as the catalyst simultaneously isomerizes and enchains sequences of polymer of the syndiotactic structure; occasionally this mechanism is disturbed by a haptocity change of the fluorenyl-transition metal bonding or through inversion of the chiral nitrogen center, leading to the loss of steric control and formation of short sequences of atactic blocks whithin a predominantly syndiotactic polymer chain. This mechanism differs from that put forward for syndiospecific catalysts such as the active species formed from isopropylidene [cyclopentadienyl-9-fluorenyl] zirconium dichloride as disclosed in U.S. Pat. No. 4,892,851 wherein the fluorenyl ring exhibits mainly pentahapto bonding, i.e., all five carbon atoms of the fluorenyl rings are coordinated with the zirconium atom.

It is believed that the present catalysts demonstrate a reversible transformation of syndiospecific sites to atactic specific sites through a haptocity change related stereoregulation/stereoderegulation mechanism.

In theory, the steric condition for a preferred orientation of the growing chain, adoption of one of the two possible conformation, intermittently disyndiotactic/atactic block polypropyleneears and the coordination and insertion of either of the propylene prochiral faces at both lateral coordination positions becomes accidental. This mechanism enchains atactic sequences in a predominantly syndiotactic polymer chain by a spontaneous change in haptocity of the bonding between the fluorenyl and the transition metal from pentahapto to tri- and possibly mono-hapto bonding which results in the loss of stereoregulating property of the sites.

This electro-dynamic behavior of the active species provides in effect a temporary transformation of enantiotopic, equivalent sites to non-enantiotopic, non-equivalent environment at the lateral coordination positions, atactic sequences being formed whenever this occurs. Theoretically, only when both events, i.e., periodic loss of stereoregularity and the stereospecific character of the catalyst occur simultaneously, is a syndiotactic/atactic block homopolymer formed.

When catalysts of the present invention are used in polymerization of olefins, the polymer which results is of a syndio-/atactic microstructure as illustrated below:

In a preferred embodiment of the catalyst $(C_4R'_mC_5C_4R'_n)$ is preferably a substituted cyclopentadienyl ring with bulky substituents in 2 and 7 or positions combined 1,8 or 3,6 or 4,5 positions are also envisageble) such as tert-butyl and trimethylsilyl;

$(C_4R'_mC_5C_4R'_n)$ is more preferably a substituted fluorenyl radical; Me is preferably titanium, zirconium or hafnium, more preferably zirconium or titanium and most preferably titanium; Q is preferably a halogen and is most preferably chlorine; and R" is preferably a silyl or hydrocarbyl biradical of at least one silicon or carbon atom which is coordinated with the heteroatom ligand and with $(C_4R'_mC_5C_4R'_n)$, most preferably a silyl or hydrocarbyl biradical of at least one silicon or carbon atom being connected with heteroatom ligand and $(C_4R'_mC_5C_4R'R_n)$ moiety.

Exemplary hydrocarbyl biradicals for the structural bridge include ethyl, propyl, butyl, pentyl, hexyl, heptyl, octyl, nonyl, decyl, and the like. Other hydrocarbyl radicals useful as the structural bridge in the present catalysts include linear alkyl radicals of 1–10 carbon atoms or branched alkyl radicals of 1–20 carbon atoms, preferably one carbon atom, which may be substituted or unsubstituted, preferably substituted.

Exemplary silyl biradicals for structural bridge include dimethylsilyl (which is preferred), diphenylsilyl of the general formula $R_2Si=$, with each R independently being any $C_1$–$C_{20}$ hydrocarbyl or $C_1$–$C_{20}$, mono-, di- or trialkyl silyl radicals.

The catalyst may be prepared by any method known in the art. Generally, the preparation of the catalyst complex consists of forming and isolating the substituted cyclopentadienyl or fluorenyl ligands which are then reacted with a halogenated metal to form the complex. The preferred method is that disclosed in U.S. Pat. Nos. 4,892,851. The catalyst may further be supported on an organic or inorganic carrier. The synthesis process generally comprises the steps of (1) preparing the halogenated or alkylated metal compound, (2) preparing the ligand, (3) synthesizing the complex, and (4) purifying the complex.

The present metallocene catalysts are useful in many of the polymerization processes (solution, slurry or gas phase) known in the art including many of those disclosed for the preparation of crystalline or amorphous polypropylene. When the catalysts are used in these types of processes, the processes produce syndiotactic atactic block polymers.

Further examples of polymerization processes useful in the practice of the present invention include those disclosed in U.S. Pat. No. 4,767,735 and European Patent Application Publication No. 310,734, the disclosures of which are hereby incorporated herein by reference. These preferred polymerization procedures include the step of prepolymerizing the catalyst and/or precontacting the catalyst with a cocatalyst and an olefin monomer prior to introducing the catalyst into a reaction zone.

The ionizing agent is an alumoxane, an aluminum alkyl, other Lewis acid or a combination thereof which will ionize a neutral metallocene compound to form a cationic metallocene catalyst. Examples of such ionizing agents are methyl alumoxane (MAO), triethyl aluminum (TEAl) and tris (pentafluorophenyl)boron. Other ionizing agents are disclosed in European Patent Publication Nos. 277003 and 277004 which are hereby incorporated by reference.

The present syndio-/atactic-specific catalysts are particularly useful in combination with an aluminum alkyl cocatalyst or with an alumoxane, preferably with the latter.

In addition, a complex may be isolated between a metallocene catalyst as described herein and an aluminum cocatalyst in accordance with the teachings of European Patent Publication Number 226,463. As disclosed therein, a metallocene is reacted with an excess of alumoxane in the presence of a suitable solvent. A complex of the metallocene and alumoxane may be isolated and used as a catalyst in the present invention.

The alumoxanes useful in combination with the catalysts of the present invention, either in the polymerization reaction or in forming the complex disclosed above, may be represented by the general formula $(R-Al-O-)_n$ in the cyclic form and R $(R-Al-O-)_nAlR_2$ in the linear form wherein R is an alkyl group with one to five carbon atoms and n is an integer from 1 to about 20. Most preferably, R is a methyl group and the preferred alumoxane is methylalumoxane (MAO). The alumoxanes can be represented structurally as follows:

$n=15-20$

The alumoxanes can be prepared by various methods known in the art. Preferably, they are prepared by contacting water with a solution of trialkyl aluminum, such as trimethyl aluminum, in a suitable solvent such as a benzene. Another preferred method includes the preparation of alumcxane in the presence of a hydrated copper sulfate as described in the U.S. Pat. No. 4,404,344 the disclosure of which is hereby incorporated by reference. This method comprises treating a dilute solution of trimethyl aluminum in toluene with copper sulfate. The preparation of other aluminum cocatalysts useful in the present process may be prepared by methods known to those skilled in the art.

The Examples given below illustrate the present invention and its various advantages and benefits in more detail.

EXAMPLE 1

The synthesis procedure was performed under an inert gas atmosphere using a Vacuum Atmospheres glovebox or Schlenk techniques.

Step 1

Preparation of the 2,7-di-tert-butylfluorenyl-dimethylsilyl-chloride (1)

a) Aromatization of the fluorene: In a one liter flask equipped with magnetic stirring bar, nitrogen inlet and reflux condenser, there was added a solution of 0.1 mol 2,7-di-tert-butylfluorene in 300 cc of diethyl ether. To this solution was added at room temperature dropwise 0.1 equimol of methyllithium in ether (1.6 molar). The reaction was completed after gas evolution stops. The orange solution was used in the next step.

b) Reaction with dimethyldichlorosilane: The orange solution prepared in step 1a was added dropwise to a solution of 0.1 mol of dimethyldichlorosilane in 200 cc of ether. The mixture was stirred for several hours at room temperature until the reaction was completed.

Step 2
Preparation of tert-butyllithiumamide (2).

In a one liter flask equipped with magnetic stirring bar, nitrogen inlet and reflux condenser 0.1 mol of tert-butylamine was dissolved in 200 cc of diethyl ether. The solution was cooled to −78° C. One equimol of methyllithium in ether was added dropwise to the solution. The temperature was increased to room temperature slowly. The reaction mixture was stirred for several hours at room temperature until the formation of the title compound was complete.

Step 3
Preparation of 2,7-di-tert-butylfluorenyl-dimethylsilyl-tert-butylamine (3).

The reaction products prepared in step 2 and step 3 were added together and stirred for several hours at room temperature. The LiCl formed as byproduct was filtered off and the ether filterate was subjected to evaporation. The title compound was obtained as a yellow oil.

Step 4
Preparation of 2,7-di-tert-butyl-dimethyl-tert-butylamido titanium dichloride (4).

a) Formation of dianion: 0.25 mol of 3 was dissolved in 200 cc of diethylether. To this solution was added dropwise 0.5 mol of methyllithium in ether. The solution became red. The reaction was stopped after gas evolution had stopped b) Reaction of the dianion with TiCl4

The red powder obtained after evaporation of the ether from the solution resulting from step 4b was washed several times with pentane and then reacted with 0.25 mol of TiCl4 in 200 cc pentane. The mixture was stirred for several hours at room temperature and filtered to separate the LiCl. Evaporation of the solvent led to the isolation of a brown powder. Recrystalization of the product from dichloromethane provided spectroscopically pure product "4" (Cf FIG. 2 HNMR).

EXAMPLES 2 and 3

2,7-di-tert-butyl-fluorenyl-dimethylsilyl-tert-butylamido-zirconium dichloride ("5") and the corresponding hafnium derivative ("6") were formed by repeating example 1 while in step 4b respectively ZrCl4 or HfCl4 were used instead of TiCl4.

EXAMPLES 4 to 6

Examples 1 to 3 were repeated while using diphenyldichlorosilane instead of dimethyldichlorosilane in step 1b. The following metallocenes were formed:

2, 7-di tert-butylfluorenyldiphenylsilyl tertbutylamido titaniumdichloride ("7").

2, 7-ditert-butylfluorenyldiphenylsilyl tertbutylamido zirconiumdichloride ("8").

2,7-ditert-butylfluorenyldiphenylsilyl tertbutylamido hafniumdichloride ("9").

EXAMPLES 7–14

Propylene was polymerized using the metallocenes produced by examples 1 to 6. Two liters of liquid propylene were introduced into a 4 liter bench reactor at room temperature. The metallocene was placed in three milliliters of a 11% solution of MAO in toluene to form a solution which was added to the reactor and the temperature increased to 40° C. The polymerization reaction was allowed to run for 60 minutes during which time the reactor was maintained at the temperature indicated in Tab. 1 for each individual run. The reaction was terminated by venting the reactor of monomer. The catalyst activity in grams of polypropylene per grams of catalyst per hour was calculated. The molecular weight, molecular weight distrubution and $^{13}C$ NMR analysis of the polymer were determined. The results are shown in Table 1.

TABLE 1 polymerization conditions and results with 4, 5, 6 and 7.

| CATA | Polym. Temp. deg C. | Catalyst (mg) | Polymer (g) | Activity g/g.h) | Mn fluff (KDa) | Mw fluff (KDa) | Mz fluff (KDa) | MWD | mm (%) | rr (%) | mr (%) |
|---|---|---|---|---|---|---|---|---|---|---|---|
| 4 | 60 Bulk | 1.1 | 180 | 160000 | 98 | 317 | 835 | 3.2 | 3.75 | 79.86 | 16.39 |
| 4 | 80 Bulk | 2.1 | 150 | 75000 | — | — | — | — | 4.9 | 72.74 | 22.36 |
| 4 | 40 Bulk | 3.2 | 86 | 27000 | 157 | 405 | 969 | 2.6 | 3.91 | 83.37 | 12.72 |
| 4 | 60 in cC6 | 2.4 | 124 | 52560 | 114 | 297 | 631 | 2.6 | 3.71 | 74.6 | 21.69 |
| 4 | 60 C3-/C2- | 3.4 | 150 | 50000 | 94 | 338 | 831 | 3.6 | 2.35 | 80.72 | 16.93 |
| 5 | 60 Bulk | 3.8 | 250 | 66000 | 1.1 | 19 | — | — | 3.8 | 85.54 | 10.67 |
| 6 | 60 Bulk | 4.2 | 2 | 952 | — | — | — | — | — | — | — |
| 7 | 60 Bulk | 2.4 | 45 | 18750 | 190 | 687 | 1630 | 3.6 | 6.03 | 72.08 | 21.89 | cC6: Cyclohexane
—: not determined

EXAMPLE 7
polymerization of propylene with "4" at 60° C.

EXAMPLE 8
polymerization of propylene with "4" at 40° C.

EXAMPLE 9
polymerization of Propylene with "4" at 40° C.

EXAMPLE 10
polymerization of propylene with "4" at 60° C. in 1 liter of cyclohexane EXAMPLE 11
copolymerization of propylene and ethylene with "4" at 60° C.

EXAMPLE 12
polymerization of propylene with "5" at 60° C.

EXAMPLE 13
polymerization of propylene with "6" at 60° C.

EXAMPLE 14
polymerization of propylene with "7" at 60° C.

The polymerization conditions and results are summarized in Table 1.

EXAMPLE 15

6 batches of syndiotactic/atactic polypropylene (batches A to F) were prepared on pilot plant scale using a 120l reactor using catalyst 4. In this Example, the reaction was performed in the presence of cyclohexane as a solvent (the reaction could be performed in the presence or absence of solvent) at a starting temperature of 40° C. (starting temperatures of 35° C. to 60° C. can be used). Temperature and pressure were monitored during the reaction. The reaction is exothermic and the temperature was allowed to increase. The end of the reaction was determined when the temperature stopped increasing. The pressure during the reaction was maintained at 12 bar by addition of monomer. Consumption of monomer would tend to reduce the pressure otherwise. At the end of the reaction, conventional polypropylene antioxidants were added to the material. Polymer was recovered by steam stripping to remove solvent and produce white polymer crumbs in water, which were then further processed.

Various properties of the polymer product are set out in Table 2 and compared against Finaprene type pilot plant products F401 and F414. Finaprene is a commercially available elastomer produced by solution polymerisation using anionic-type initiators and is based on butadiene and styrene monomers.

It will be apparent from Table 2 that batches A to F increase in molecular weight and this increase in molecular weight tends to give rise to advantageous properties. In particular, elongation increases, and tensile strength and tensile modulus both decrease with increasing molecular weight. This suggests that the higher molecular weight material may be softer, which could partly result from an increased atactic content in the block copolymer. Depending on the end use of the syndiotactic/atactic block polypropylene, molecular weight and atactic/syndiotactic ratio may be optimised accordingly.

Figure 1:
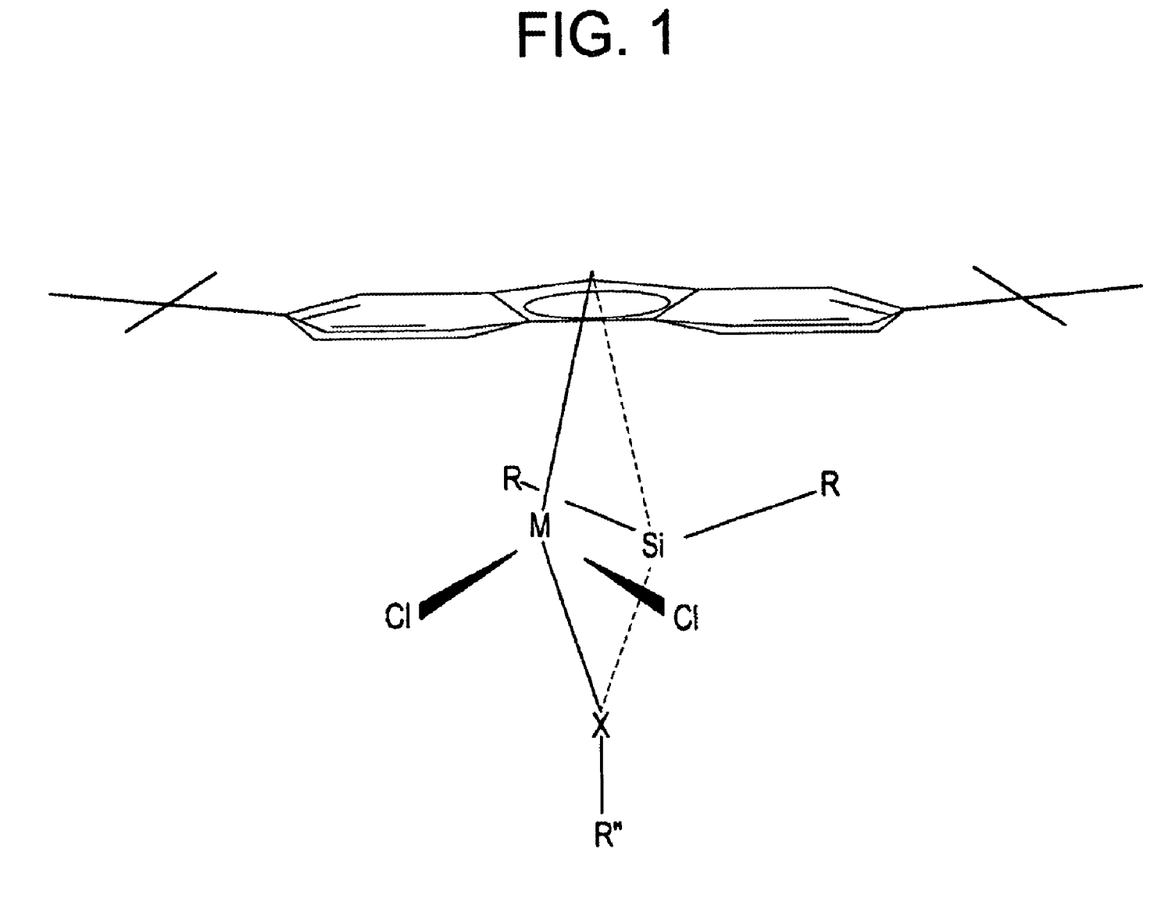
FIG. 1 shows the structure of a catalyst precursor, 2,7-bis-tert-butyl-fluorenyl-9-dimethylsylyl-tert-butyl-amido titanium dichloride.
Figure 2:
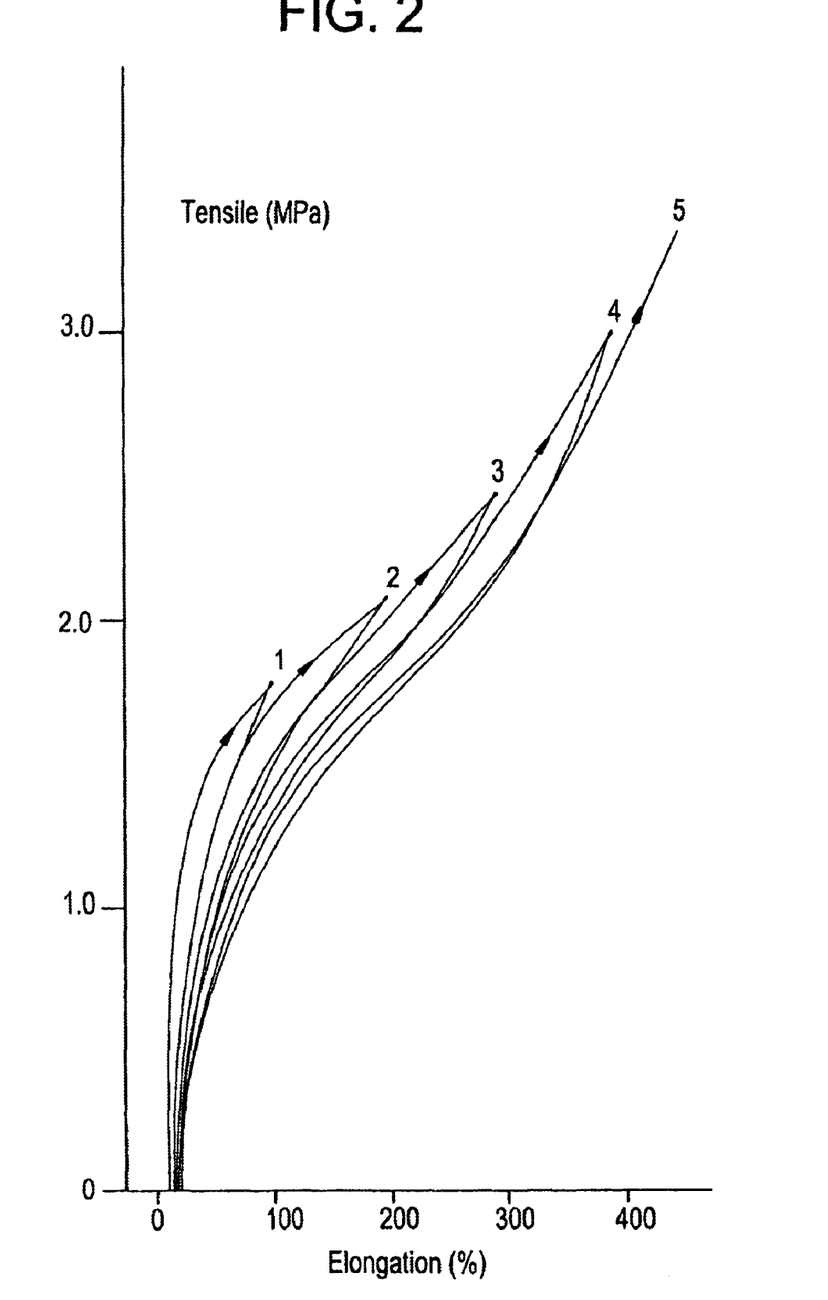
FIG. 2 shows hysteresis behaviour of a Finaprene 414 (pilot plant sample)
Figure 3:
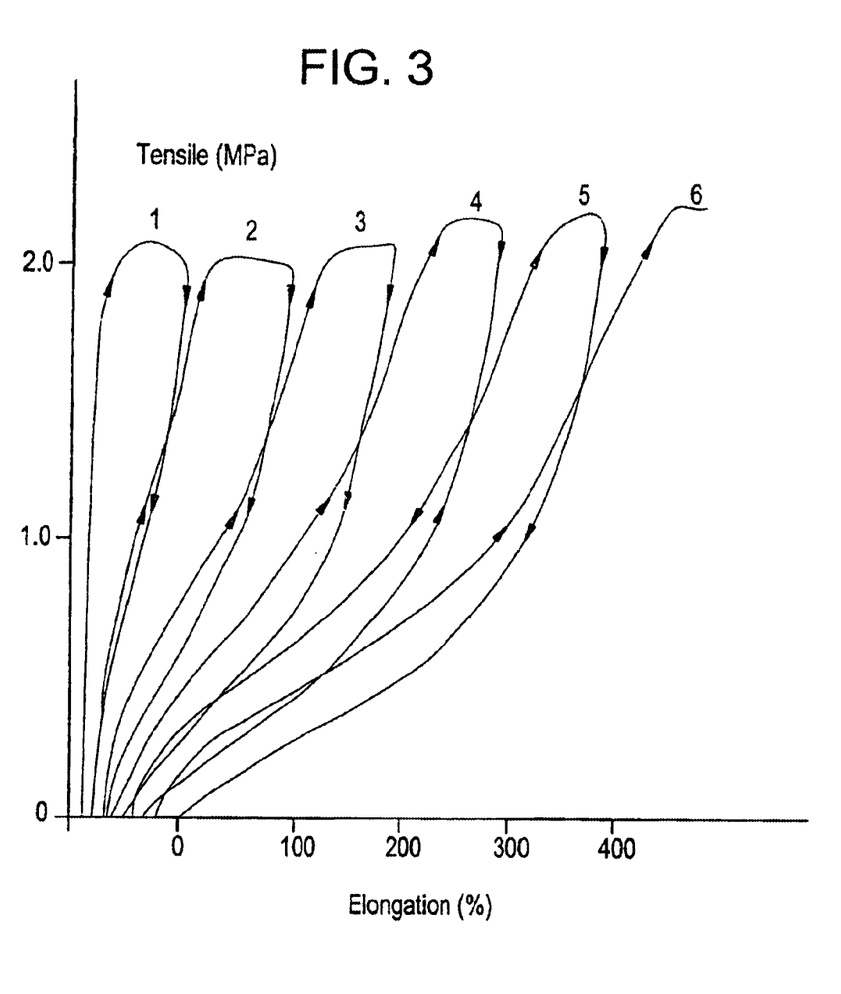
FIG. 3 shows the hysteresis behaviour of a syndiotactic/atactic block polypropylene according to the present invention.

FIGS. 2 and 3 show respectively the hysteresis behaviour of Finaprene 414 (pilot plant sample) and the corresponding behaviour of syndiotactic/atactic block polypropylene. In contrast to the Finaprene 414, syndiotactic/atactic block polypropylene hysteresis exhibits a constant tensile strength. Hardness decreases because the modulus decreases and rebound and melt flow index both decrease with increasing molecular weight. Compression set also decreases indicating that the polymer returns to its original shape and has good shape memory. All these trends indicate that a high molecular weight is favourable for the uses of the present invention. In particular, it is clear that the syndiotactic/atactic polypropylene combines high elongation and lower rebound as compared with the prior art polymers such as polybutene. This is unusual and very advantageous for the uses of the present invention.

EXAMPLE 16

In this Example, batch E of syndiotactic/atactic polypropylene was subjected to different crystallisation times and compared again to the Finaprene F401 and F414 pilot plant materials. As set out in Table 3, the results indicate that adjustment of crystallisation time will affect the final properties of the polymer enabling it to be tailored for particular uses. Appropriate adjustment of the crystallisation time will affect the shapability and shrinkability of the polymer and can therefore be adjusted for use as a shapable composition or for use as a shrinkable packaging film. The final properties of drawn fibre can also be modulated in this way.

Table 4 sets out in further detail fusion and crystallisation parameters according to the indicated programme for a number of batches of the syndiotactic/atactic polypropylene according to the invention.

EXAMPLE 17

Footwear formulations were made as set out in Table 5 in which a blend of syndiotactic/atactic polypropylene with Finaprene F484 was compared with a standard Finaprene formulation. It was found that the melt flow index was higher when the syndiotactic/atactic polypropylene was used, enabling a higher output of material. However, the hardness of the material was very similar to the standard formulation. This suggests lower cost of production of material according to the present invention without loss of hardness, as compared with conventional formulations. Both rebound and elongation were lowered according to the invention suggesting better shock absorbance. The formulations according to the invention would therefore be excellent for use as soles in jogging shoes, for example.

EXAMPLE 18

The ability of syndiotactic/atactic to tolerate modification with mineral fillers was examined. Table 6 shows a comparison of various properties of blends of syndiotactic/atactic polypropylene with talc or carbon black as compared with pure syndiotactic/atactic polypropylene. It is apparent from the Table that hardness is only slightly altered through the addition of mineral fillers. This is unusual and is unexpected and represents a useful property because it is therefore possible to dilute the syndiotactic/atactic polypropylene without significant hardness variation. It is also found that the tensile strength at yield increases in spite of any large change in hardness. This is useful because the mineral fillers may be used to adjust the tensile strength without affecting the hardness thereby affording a degree of control over the final properties of the modified syndiotactic/atactic polypropylene depending on the use to which it is to be put. It will also be apparent from the Table that the rebound has been lowered upon modification with the mineral fillers. This property is useful in the production of shock absorbers.

EXAMPLE 19

The usefulness of syndiotactic/atactic polypropylene as a polymer modifier was investigated taking commercially-available polypropylene PP9060 as an example of a polymer to be modified. The results are set out in Table 7. It will be apparent from the Table that PP9060 modified with 5% syndiotactic/atactic polypropylene produces a material which, most strikingly, has an exceptional impact resistance when unnotched. This suggests that the syndiotactic/atactic polypropylene is highly useful as a polypropylene modifier and that the modified polypropylene would have utility as a shock absorber, a waterproof membrane, in packaging film, as a drawn film and in shapable compositions.

EXAMPLE 20

Figure 4:
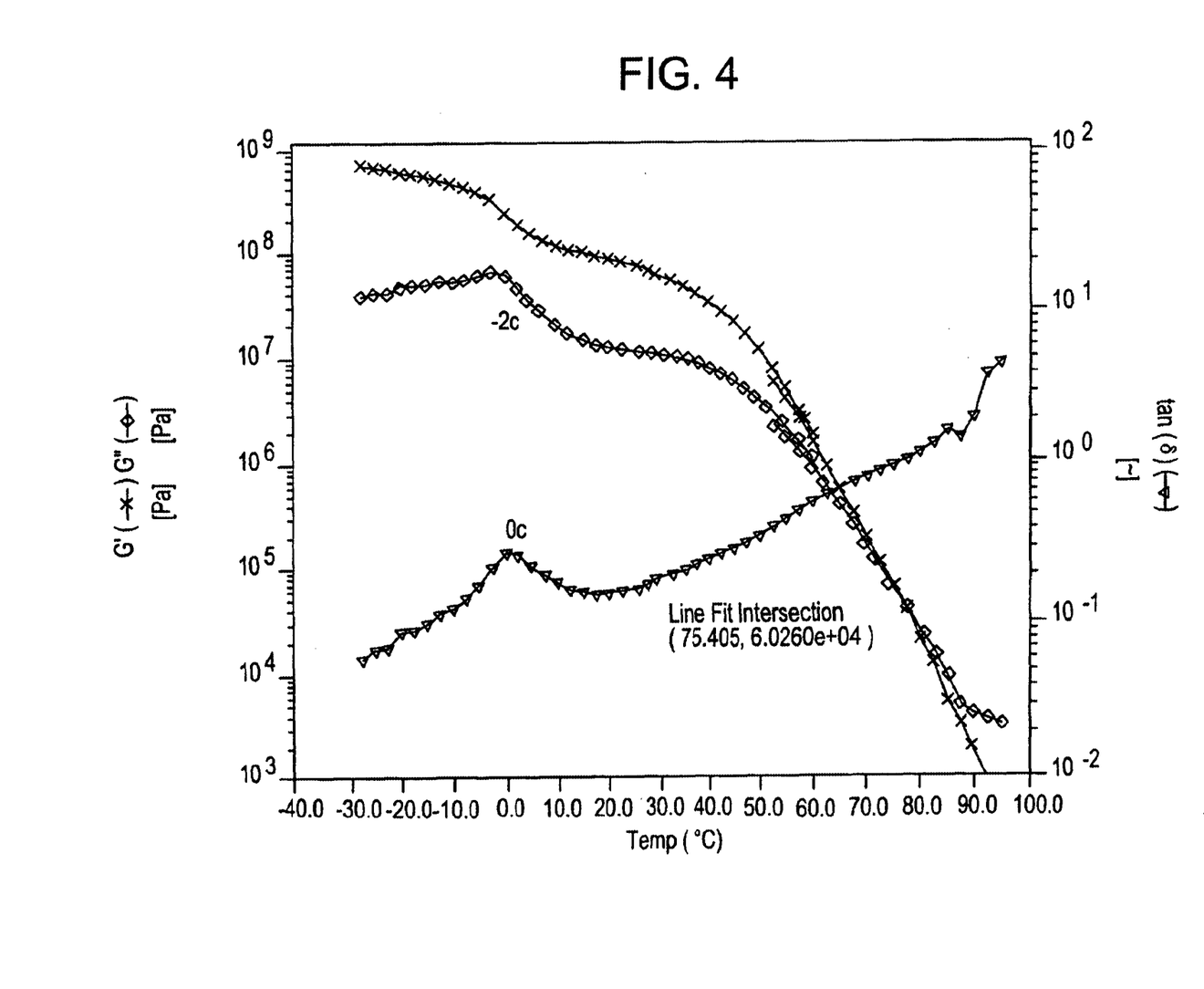
FIGS. 4 to 6 show graphs of G', G" and tan δ plotted against temperature for three different adhesive formulations according to the present invention.
Figure 5:
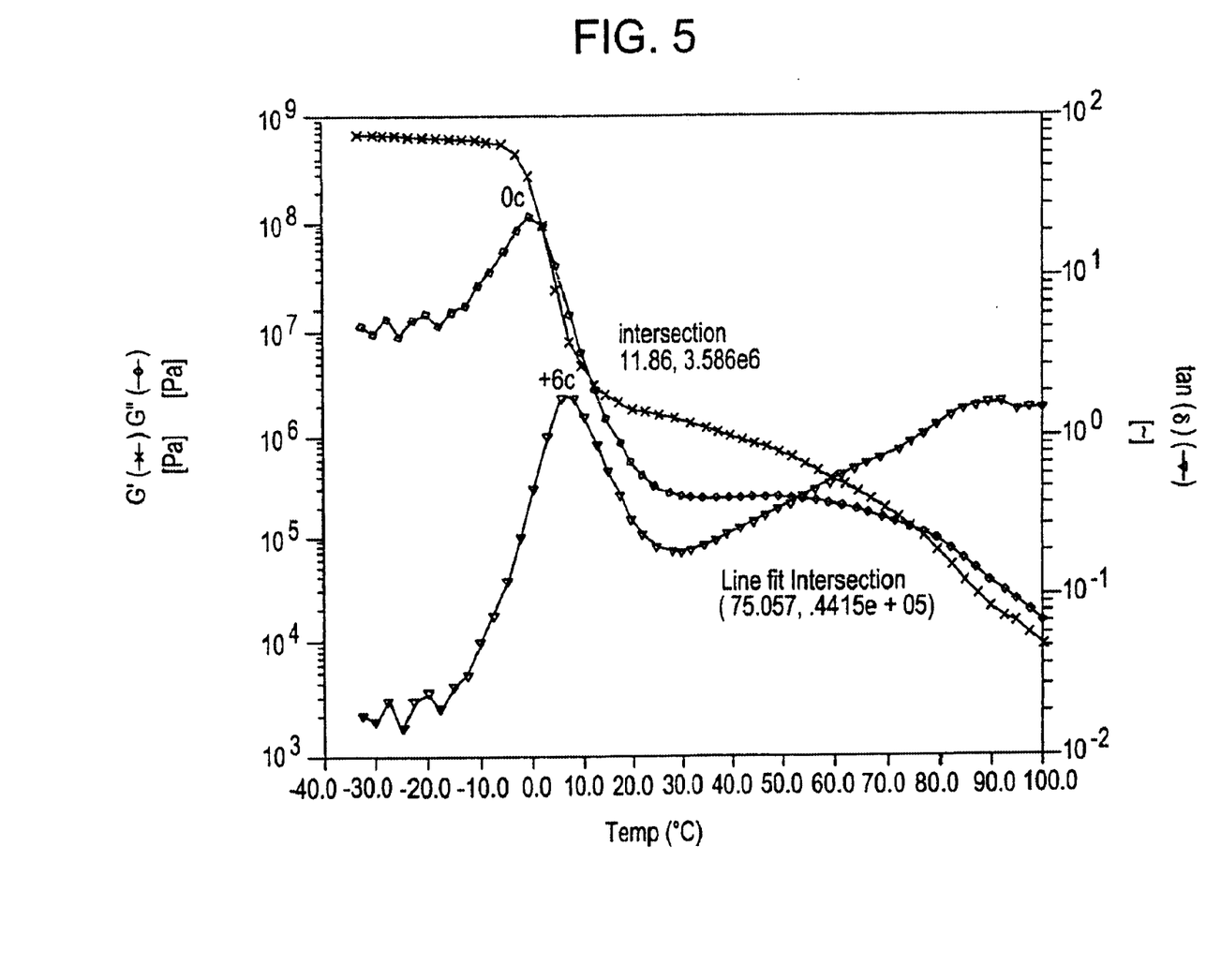
Figure 6:
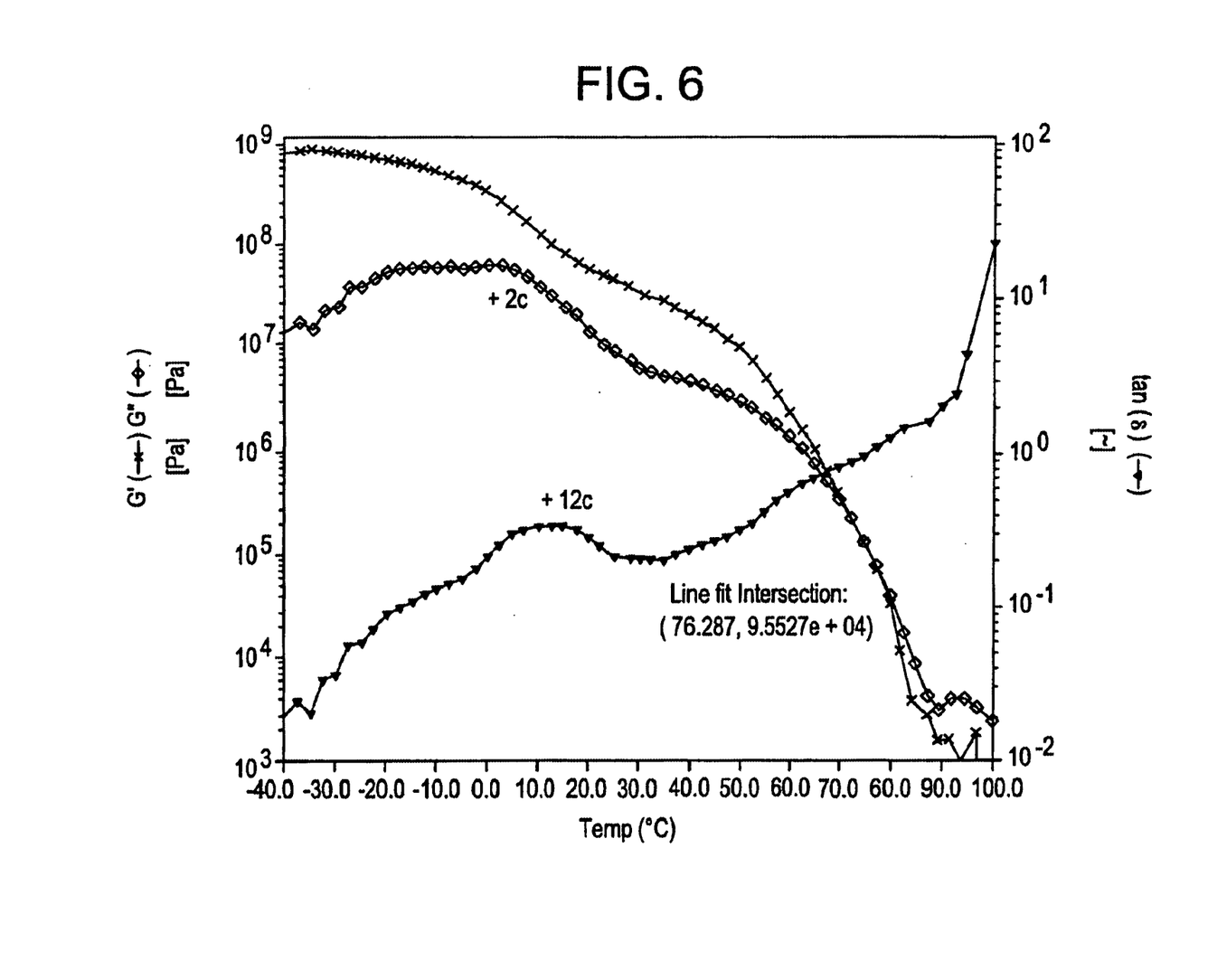

Bitumen was modified with syndiotactic/atactic polypropylene by mixing together 13% of syndiotactic/atactic polypropylene with 87% standard bitumen in a low speed blender. Various properties of the modified bitumen were assessed and the results presented in Table 8. It appears that the syndiotactic/atactic polypropylene forms a dispersed phase in a continuous phase of bitumen and that no significant swelling of the dispersed phase occurs. This is useful because it enables a degree of control over the modified bitumen product which is not readily available in the prior art. The modified bitumen may be used as a waterproof membrane or in the manufacture of joints where it is expected that application of syndiotactic/atactic polypropylene to a surface is easier to control.

each figure G' and G" are plotted against temperature. Also plotted against temperature is the glass transition temperature-tan(δ). FIG. 4 shows that the corresponding formulation is out of range of the "application window" for bookbinding whereas the formulations examined in FIGS. 5 and 6 are seen to be valuable for bookbinding applications.

TABLE 2

PROPERTIES OF saPP STEREOBLOCK
after 48 h crystallisation

| Batch | Finaprene pilot plant products | | syndiotactic/isotactic polypropylene | | | | | |
|---|---|---|---|---|---|---|---|---|
| | F401 | F414 | A | B | C | D | E | F |
| GPC Mw (1000) | 176 | 107 | 64 | 70 | 93 | 107 | 127 | 186 |
| NMR % aPP | — | — | 8.9 | 11.0 | 10.5 | 8.9 | 16.4 | 18.4 |
| DSC 1st T°MAX | — | — | 127 | 123 | 89 | 123 | — | 146 |
| TENSILE STRENGTH ELONGATION (%) | | | | | | | | |
| at yield | 5 | 5 | 13 | 15 | 15 | 15 | 37 | 50 |
| at break | 500 | 1100 | 18 | 22 | 26 | 80 | 240 | 1100 |
| TENSILE STRENGTH (MPa) | | | | | | | | |
| at yield | 1.8 | 4.5 | 12.8 | 12.8 | 13.2 | 13.0 | 3.1 | 1.9 |
| at break | 5.0 | 35.0 | 11.0 | 10.0 | 9.1 | 8.0 | 2.6 | 3.1 |
| TENSILE MODULUS (MPa) | 7 | 260 | 290 | 285 | 235 | 225 | 35 | 18 |
| HYSTERESIS | | | | | | | | |
| Elongation % | 450 | 914 | — | — | — | — | — | 578 |
| Tensile Strength (MPa) | 3.3 | 15.1 | — | — | — | — | — | 2.2 |
| Cycle | 5 | 10 | — | — | — | — | — | 6 |
| HARDNESS Shore A | 57 | >100 | 98 | 98 | 98 | 96 | 84 | 75 |
| REBOUND (%) | 80 | 70 | 35 | 29 | 28 | 30 | 15 | 13 |
| M.F.I. 5/200 (g/10') | 0.1 | 8.0 | 113 | 90.0 | 32.0 | 15.5 | 19.4 | 8.0 |
| COMPRESSION SET (%) | 43 | 66 | 66 | 58 | 55 | 52 | 48 | 45 |

TENSILE: 50 mm - 500 mm/min (SBS condition 100%/min)
MODULUS at 1%: 50 mm - 0.5 mm/min
HARDNESS & REBOUND: on 4 pieces 2 mm in thickness = 8 mm total

EXAMPLE 21

Adhesive compositions were prepared using syndiotactic/atactic polypropylene in combination with various other standard adhesive components. The adhesive compositions are set out in Table 9, together with some of their properties. Adhesive formulations 2 and 3 in the Table are useful in bookbinding applications. This may be deduced from the so-called bookbinding "application window" in which the storage modulus G' is in the range $3 \times 10^6$ to $5 \times 10^7$ and the glass transition temperature of the soft phase, Tg is in the range 5 to 30° C. Both formulations 2 and 3 fall within this range. The Theological behaviour of formulations 1, 2 and 3 are shown graphically in FIGS. 4, 5 and 6 respectively. In

TABLE 3

PROPERTIES OF saPP STEREOBLOCK

| Batch | Finaprene pilot plant product | | syndiotactic/ isotactic polypropylene | | |
|---|---|---|---|---|---|
| | F401 | F414 | E | E | E |
| Crystallisation Time | | | 240 hours | 48 hours | 2 hours |
| GPC Mw (1000) | 176 | 107 | 127 | 127 | 127 |
| NMR % aPP | — | — | | | |
| DSC Tm (°) | — | — | — | no peak | 56 |
| TENSILE STRENGTH ELONGATION (%) | | | | | |
| at yield | 5 | 5 | 30 | 37 | 75 |
| at break | 500 | 1100 | 95 | 240 | 1400 |
| TENSILE STRENGTH (MPa) | | | | | |
| at yield | 1.8 | 4.5 | 3.1 | 3.1 | 1.3 |
| at break | 5.0 | 35.0 | 2.1 | 2.6 | 2.1 |
| TENSILE MODULUS (MPa) | 7 | 260 | — | 35 | 5 |

TENSILE: 50 mm–500 mm/min (SBS condition 100%/min)
MODULUS at 1%: 50 mm–0.5 mm/min

TABLE 4

| | First Fusion | | | Crystallisation | | | Second Fusion | | |
|---|---|---|---|---|---|---|---|---|---|
| | T°max | onset | Δ H:J/g | T°max | onset | Δ H:J/g | T°max | onset | Δ H:J/g |
| A | 127.4 | 119.8 | 47.28 | 79.4 | 101.4 | −25.16 | 127.6 | 108.4 | 33.73 |
| B | 122.6 | — | 44.27 | — | — | — | 110.4 | 80.4 | 25.76 |
| C | 88.6 | 83.0 | 56.61 | 66.6 | 86.0 | −19.77 | 103.8 | 83.6 | 41.33 |
| D | 122.6 | 73.0 | 41.23 | 69.6 | 85.8 | −20.81 | 109.6 | 90.0 | 29.27 |
| F | 146.2 | 97.4 | 400.28 | — | — | — | — | — | — |
| G | — | — | — | 87.0 | 97.8 | −22.13 | 120.4 | 108.8 | 44.04 |
| H | 130.6 | 101.6 | 85.29 | 102.8 | 107.4 | −37.38 | 131.2 | 116.8 | 45.15 |
| I | 139.0 | 128.8 | 69.43 | 92.8 | 105.6 | −31.94 | 134.6 | 122.4 | 39.44 |

Programme: 20° → 220° 20°/min
220° 2 min
220 → 20° −20°/min
20° 3 min
20 → 200° 20°/min

TABLE 5 saPP IN FOOTWEAR FORMULATION

| | INJECTION | COMPRESSION | COMPRESSION |
|---|---|---|---|
| Finaprene F484 | 90 | 90 | — |
| Finaprene F435 | 40 | — | — |
| saPP:batch F | — | 40 | 100 |
| gpps H888 | 25 | 25 | — |
| HIPS R85 | 25 | 25 | — |
| OIL 130 SN | 47 | 47 | — |
| MFI 5/190° C. (g/10″) | 58 | 100 | 6.0 |
| HARDNESS | | | |
| (Shore A1) | 57 | 55 | 78 |
| (Shore A3) | — | 52 | 75 |
| REBOUND (%) | 61 | 44 | 13 |
| TENSILE STRENGTH ELONGATION (%) | | | |
| at break | 465 | 135 | 1100 |
| TENSILE STRENGTH (MPa) | | | |
| at break | 5.6 | 1.3 | 3.1 |
| TENSILE MODULUS (MPa) | — | 9 | 18 |

All components: parts per weight (ppw)
DENSITY of saPP: 0.877
gpps = general purpose polystyrene
HIPS = high impact polystyrene

TABLE 6 saPP MODIFIED WITH "TALC" AND "CARBON BLACK"

| | | | |
|---|---|---|---|
| saPP: batch F | 66 | 66 | 100 |
| TALC | 33 | — | — |
| CARBON BLACK | — | 33 | — |
| MFI 5/190° C. | 6.3 | 0.7 | 6.0 |
| HARDNESS | | | |
| (Shore A1) | 74 | 82 | 78 |
| (Shore A3) | 73 | 80 | 75 |
| REBOUND (%) | 7 | 8 | 13 |
| TENSILE STRENGTH ELONGATION (%) | | | |
| at yield | 70 | 70 | 50 |
| at break | 180 | 260 | 1100 |

TABLE 6-continued saPP MODIFIED WITH "TALC" AND "CARBON BLACK"

| | | | |
|---|---|---|---|
| TENSILE STRENGTH (MPa) | | | |
| at yield | 2.7 | 2.7 | 1.9 |
| at break | 2.1 | 2.1 | 3.1 |
| TENSILE MODULUS (MPa) | 12 | 10 | 18 |

All components: parts per weight (ppw)

TABLE 7

PROPERTIES OF saPP MODIFIED PP9060

| | | | |
|---|---|---|---|
| PP 9060 | | 100 | 95 |
| saPP: batch F | | 0 | 5 |
| OPTICAL PROPERTIES | | | |
| Haze; | % | 96.7 | 95.5 |
| Transmittance; | % | 82.0 | 79.3 |
| MECHANICAL PROPERTIES | | | |
| Tensile strength; | MPa | | |
| at yield | | 13.2 | 30.6 |
| at break | | 17.0 | 16.1 |
| Elongation at break; | % | | |
| at yield | | 12.8 | 14.2 |
| at break | | 258 | 161 |
| Tensile modulus; | MPa | 620 | 600 |
| Flexural modulus; | MPa | | |
| 0.4% | | 1515 | 1300 |
| 1.0% | | 1497 | 1271 |
| 2.0% | | 1369 | 1160 |
| Flexural yield strength; | MPa | 33.8 | 34.3 |
| Falling weight; | failure | chronic brittle | brittle |
| E. max; | J | 0.63 | 0.91 |
| F. max; | N | 316 | 327 |
| Izod at 23° C.; | J/m | | |
| notched | | 31.2 | 31.2 |
| unnotched | | 1047 | NO BREAK |
| Izod at −20° C.; | J/m | | |
| notched | | 21.9 | 21.9 |
| unnotched | | 219 | 228 |

TABLE 8 saPP MODIFIED BITUMEN
13% saPP batch F (Mw: 186000) + 87% B180/220
LOW SPEED BLENDER 1h30 −180° C. +/−500 RPM

| VISCOSITY | | mPa · s |
|---|---|---|
| at 180° C.: | 1257 | |
| at 170° C.: | 1794 | |
| at 160° C.: | 2478 | |
| at 150° C.: | 3528 | |
| at 140° C.: | 5828 | |
| at 130° C.: | 7453 | |
| at 120° C.: | 11450 | |
| at 110° C.: | 18860 | |

T° ring & ball: 80° C.
T° cold bending: −5° C.
Penetration   at 25° C.:  52 1/10 mm
              at 50° C.: 165 1/10 mm

TABLE 9 saPP MODIFIED ADHESIVE
SaPP batch F (Mw: 186000)
LOW SPEED BLENDER 1h30 −180° C. +/−500 RPM

| FORMULATION (ppw) | 1 | 2 | 3 |
|---|---|---|---|
| s-aPP | 100 | 100 | 100 |
| WAX | 70 | 0 | 70 |
| HERCOTAC 205 | 220 | 220 | 0 |
| MBG 212 | 0 | 0 | 220 |
| PROPERTIES | | | |
| Storage Modulus G' (Pa) | $8 \times 10^7$ | $3 \times 10^6$ | $5 \times 10^7$ |
| Glass transition temperature Tg (° C.) of soft phase | 0 | 6 | 12 |

What is claimed is:

1. An article or material comprising at least one of (a)–(u), wherein at least a portion of said at least one of (a)–(u) includes a syndiotactic/atactic block polypropylene component, wherein the molecular weight of the syndiotactic/atactic block polypropylene is at least 120 kD, and wherein (a)–(u) includes:
   (a) a polyolefin modifier;
   (b) an adhesive material;
   (c) a shock absorber;
   (d) a waterproof membrane;
   (e) a packaging film;
   (f) a drawn fiber, film or thread;
   (g) a shapable material;
   (h) an acoustic absorbent;
   (i) a foam material;
   (j) an oil spill absorbent;
   (k) footwear;
   (l) a gamma irradiation stable material;
   (m) a shapable composition;
   (n) a composition for molding into a footwear component
   (o) a bitumen modifier;
   (p) at least one of a compatibilizer, an emulgator and an emulsifier;
   (q) a coextrudate;
   (r) a viscosity enhancer;
   (s) a plastics recycle material;
   (t) motor oil; and
   (u) a thermoplastic elastomer gel.

2. The article or material of claim 1, wherein the syndiotactic/atactic block polypropylene has alternating blocks of syndiotactic and atactic sequecences.

3. A polyolefin modified with the polyolefin modifier of claim 1.

4. The polyolefin of claim 3, wherein the polyolefin is a high impact resistant polypropylene and wherein the polyolefin modifier is a dispersion of the syndiotactic/atactic block polypropylene in a continuous phase of at least one of isotactic and copolymeric polypropylene.

5. The polyolefin of claim 4, wherein the amount of syndiotactic/atactic block polypropylene is in the range of from about 3 to about 50% by weight of the polypropylene.

6. The article or material of claim 1, wherein the adhesive material also includes at least one other component selected from a wax, a tackifying resin and a reinforcing resin.

7. The article or material of claim 1, wherein the article or material is a shock absorber.

8. The article or material of claim 1, wherein the waterproof membrane is a sheet of syndiotactic/atactic block polypropylene modified with at least one of carbon black, a UV absorber, an antioxidant and a weather resistance enhancer.

9. The article or material of claim 1, wherein the shapable composition has a continuous phase of syndiotactic/atactic block polypropylene in which is dispersed isotactic polypropylene, copolymeric polypropylene or another polymer.

10. The article or material of claim 9, wherein the shapable composition softens upon heating and becomes rigid upon subsequent cooling.

11. The article or material of claim 10, wherein the article or material is a cast formed from the shapable composition.

12. The article or material of claim 1, wherein the acoustic absorbent includes a blend, laminate or coextrudate of syndiotactic/atactic block polypropylene with at least one of isotactic, syndiotactic or copolymeric polypropylene, or another polymer.

13. The article or material of claim 1, wherein the article or material is a foam material.

14. The foam material of claim 13, wherein a polyolefin is blended with the syndiotactic/atactic block polypropylene.

15. The foam material of claim 13, wherein the foam material is formed by one of an extruded molded foam, injection molded foam and a compressed foam.

16. The article or material of claim 1, wherein the article or material is footwear, and wherein the syndiotactic/atactic polypropylene also includes at least one of plasticizers, polymeric fillers, mineral fillers and protective agents.

17. The article or material of claim 1, the portion of at least one of (a)–(u) also includes a mineral filler.

18. A bitumen composition comprising bitumen blended with the bitumen modifier of claim 1.

19. The bitumen composition of claim 18, wherein the amount of syndiotactic/atactic polypropylene is less than 35% by weight of the composition.

20. The article or material of claim 1, wherein the article or material is motor oil.

21. The article or material of claim 1, wherein the article or material is a thermoplastic elastomer gel, and wherein the syndiotactic/atactic block polypropylene is crosslinked.

22. The article or material of claim 1, wherein the article or material is an oil spill absorbent.

23. The article or material of claim 1, wherein the article or material is plastics recycle material.

24. The article or material of claim 1, wherein the article or material is a gamma irradiation stable composition.

25. The article or material of claim 1, wherein the syndiotactic/atactic block polypropylene component has a fraction of syndiotactic triads (rr) of at least 70% as determined by $^{13}$C NMR and has a weight average molecular weight (Mw) measured by gel permeation chromatography (GPC) of at least 120,000.

26. An article or material comprising at least one of (a)–(u), wherein at least a portion of said at least one of (a)–(u) includes a syndiotactic/atactic block polypropylene component having a fraction of syndiotactic triads (rr) of at least 70% as determined by $^{13}$C NMR and has a weight average molecular weight (Mw) measured by gel permeation chromatography (GPC) of at least 120,000, and wherein (a)–(u) includes:

(a) a polyolefin modifier;
(b) an adhesive material;
(c) a shock absorber;
(d) a waterproof membrane;
(e) a packaging film;
(f) a drawn fiber, film or thread
(g) a shapable material;
(h) an acoustic absorbent;
(i) a foam material;
(j) an oil spill absorbent;
(k) footwear;
(l) a gamma irradiation stable material;
(m) a shapable composition;
(n) a composition for molding into a footwear component;
(o) a bitumen modifier;
(p) at least one of a compatibilizer, an emulgator and an emulsifier;
(q) a coextrudate;
(r) a viscosity enhancer;
(s) a plastics recycle material;
(t) motor oil; and
(u) a thermoplastic elastomer gel.

* * * * *